(12) United States Patent
Pignataro et al.

(10) Patent No.: US 9,553,831 B2
(45) Date of Patent: Jan. 24, 2017

(54) ADAPTIVE PUBLISH/SUBSCRIBE SYSTEM (71) Applicant: Cisco Technology, Inc., San Jose, CA (US)

(72) Inventors: Carlos M. Pignataro, Raleigh, NC (US); Joseph M. Clarke, Cary, NC (US); Rajesh Kumar, Palo Alto, CA (US); Mohammed Baseer Khan, Santa Clara, CA (US); Michel Khouderchah, Cupertino, CA (US); Mohamed Mostafa, Emerald Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 13/860,860

(22) Filed: Apr. 11, 2013

(65) Prior Publication Data
US 2014/0310358 A1 Oct. 16, 2014

(51) Int. Cl.
G06F 15/16 (2006.01)
H04L 12/58 (2006.01)
H04L 29/08 (2006.01)

(52) U.S. Cl.
CPC ......... *H04L 51/046* (2013.01); *H04L 67/2809* (2013.01); *H04L 67/327* (2013.01)

(58) Field of Classification Search
CPC .................................. G06F 15/16; G06N 5/02
See application file for complete search history.

(56) References Cited

U.S. PATENT DOCUMENTS

| | | | |
|---|---|---|---|
| 8,060,630 B1 | 11/2011 | Jancaitis et al. | |
| 2003/0120785 A1* | 6/2003 | Young | 709/228 |
| 2004/0068567 A1 | 4/2004 | Moran et al. | |
| 2006/0080596 A1* | 4/2006 | Bhogal et al. | 715/503 |
| 2007/0219881 A1 | 9/2007 | Peterson et al. | |
| 2010/0205100 A1 | 8/2010 | Hurley et al. | |
| 2010/0306365 A1* | 12/2010 | Gale et al. | 709/224 |
| 2011/0099232 A1* | 4/2011 | Gupta | H04L 29/08729 709/206 |
| 2011/0252337 A1 | 10/2011 | Pignataro et al. | |
| 2013/0007131 A1* | 1/2013 | Chen et al. | 709/204 |
| 2013/0067492 A1* | 3/2013 | Fidler | G06F 9/542 719/318 |

(Continued)

OTHER PUBLICATIONS

J. Jachner et al., Rich Presence: A New User Communications Experience, Technology White Paper, Alcatel Telecommunications Review, 1st Quarter 2005, 8 pages.

*Primary Examiner* — Umar Cheema
*Assistant Examiner* — Anh Nguyen
(74) *Attorney, Agent, or Firm* — Edell, Shapiro & Finnan, LLC (57) ABSTRACT

A context-driven publication option is received over a network at an adaptive publish subscribe broker from a publishing network device. The context driven publication options are presented over the network to a subscribing network device. A selection of a context-driven subscription is received over the network at the adaptive publish/subscribe broker from the subscribing network device. A publication configured for network management and operations is received at the adaptive publish/subscribe broker. Publications are filtered at the adaptive publish/subscribe broker for the subscribing network device according to the selection of the context-driven subscription.

20 Claims, 7 Drawing Sheets

(56) References Cited

U.S. PATENT DOCUMENTS

2013/0246323 A1\* 9/2013 Athas ..................... G06N 5/02
  706/46
2014/0310358 A1\* 10/2014 Pignataro et al. ............ 709/206

\* cited by examiner

ADAPTIVE PUBLISH/SUBSCRIBE SYSTEM

TECHNICAL FIELD

The present disclosure relates to communication between network devices, and in particular, the publication and subscription of data feeds between network devices.

BACKGROUND

Polling as a communication mechanism for network management and operations is encumbered by transactions that do not yield useful or actionable information in each cycle, thus delaying the system's responsiveness to significant events. Event-driven procedures can be used to reduce response delay by initiating information exchange only when needed. However, these procedures incur the disadvantage of the need to manually configure the associations between the producers and consumers of events and services.

Publish-subscribe mechanisms enhance event-driven procedures by providing decoupling, based on type and service abstractions, between producers and consumers. However, publish-subscribe mechanisms have the disadvantage of potentially overloading subscribers with published events and information, which are not always relevant to a subscriber's tasks.

DESCRIPTION OF EXAMPLE EMBODIMENTS

Overview

Adaptive publish/subscribe services are provided for network management applications. A context-driven publication option is received over a network at an adaptive publish/subscribe broker from a publishing network device. The context driven publication options are presented over the network to a subscribing network device. A selection of a context-driven subscription is received over the network at the adaptive publish/subscribe broker from the subscribing network device. A publication configured for network management and operations is received at the adaptive publish/subscribe broker. Publications are filtered at the adaptive publish/subscribe broker for the subscribing network device according to the selection of the context-driven subscription.

Example Embodiments

Figure 1:
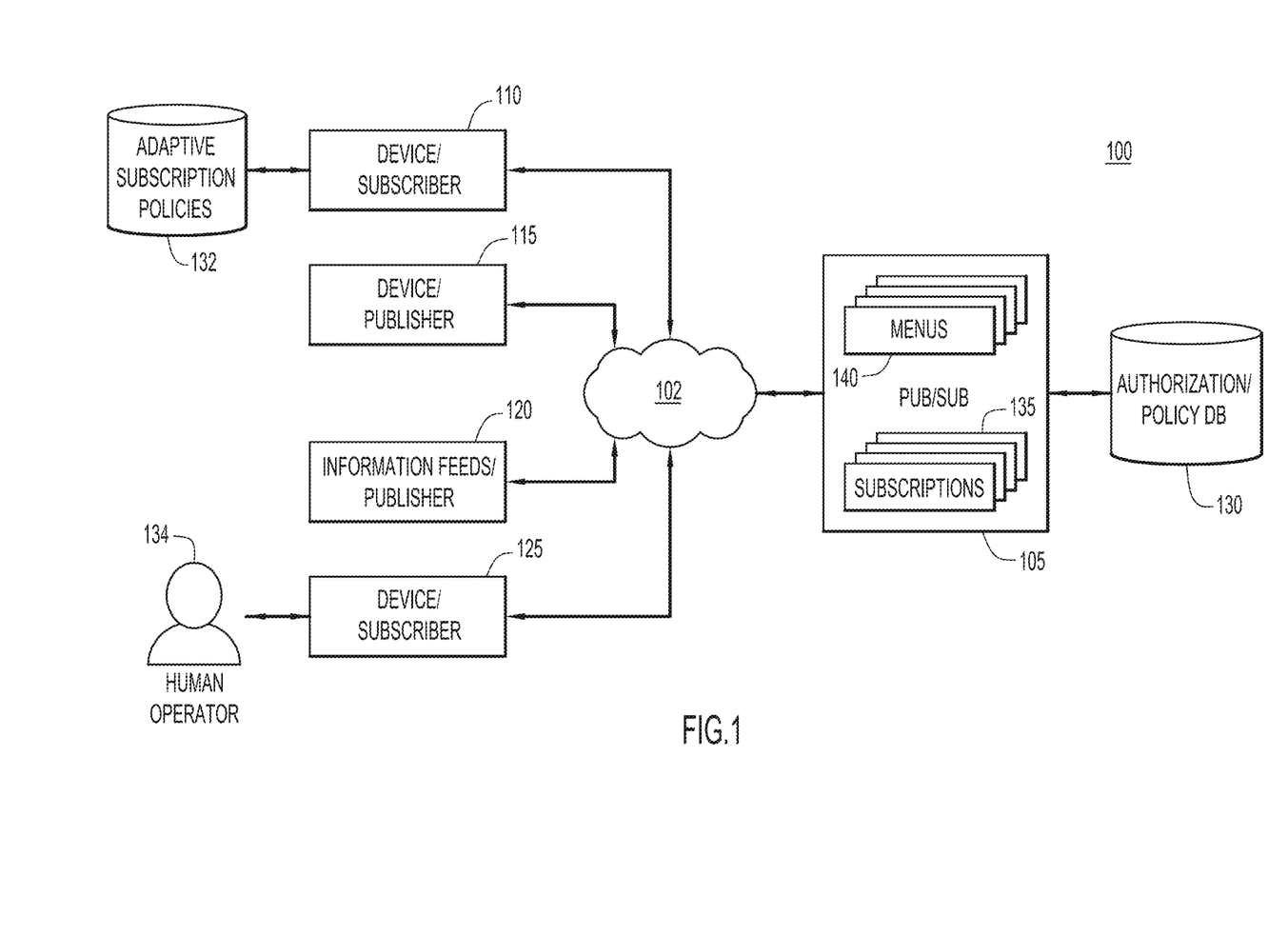
FIG. 1 is a block diagram of a system configured to provide adaptive publish/subscribe services.

Depicted in FIG. 1 is a block diagram illustrating a system 100 configured to provide an adaptive publish/subscribe system for network management and operations. The system 100 is configured to provide remote network management, policy-controlled event alerting, and inter-router service discovery and communication. Additionally, urgent communications such as fault alarms and security alarms may be communicated by system 100. According to specific examples, system 100 utilizes an instant messaging protocol, such as the extensible messaging and presence protocol ("XMPP") to provide bidirectional, adaptive publish/subscribe services overlaid on an instant message-based management/operations framework. In particular, system 100 may leverage the XEP-0060 pub-sub extension of the XMPP protocol. The instant message framework may span several organizations and locations over a wide area network ("WAN"), or be confined to a single organization.

Included in system 100 is network 102, an adaptive publish/subscribe broker 105 that is communication with a subscriber network device 110, a publisher network device 115, an information feeds publisher 120, and a user interfacing subscriber device 125. Network 102 may provide for the communications between the above-described devices. While subscriber network device 110 and publisher network device 115 are illustrated as two separate devices, a single device may serve as both a publisher device and a subscriber device. Also connected to adaptive publish/subscribe broker 105 is an authorization and policy database 130.

Adaptive publish/subscribe broker 105 is configured to discover publication data streams, such as event streams, service streams and information streams. These streams may be published from network publisher device 115 and/or information feeds publisher device 120. Publisher devices 115, 120 push data to the adaptive publish/subscribe broker 105, which pushes it to subscriber devices 110, 125.

Adaptive publish/subscribe broker 105 is further configured to present options for these data stream subscriptions to subscriber devices 110, 125. In order to appropriately select the correct subscriptions, subscriber device 110 may be equipped with adaptive subscription policies database 132, which stores information indicative of the subscriptions that should be selected by subscriber device 110. User interfacing subscriber device 125, on the other hand, makes subscription selections based on the inputs from human operator 134.

Adaptive publish/subscribe broker 105 receives context-driven subscriptions 135 back from subscriber device 110 and/or user interfacing subscriber device 125 which allow adaptive publish/subscribe broker 105 to provide subscriber device 110 and user interfacing subscriber device 125 with context-driven publications from publisher device 115. According to one specific example, the adaptive publish/subscribe broker 105 may be located at an instant messaging server, and the subscription and publication messages described herein may be sent according to an instant messaging protocol, such as XMPP.

As used herein, context driven subscriptions 135 refer to subscriptions which indicate that the publications to be sent to subscriber device 110 and/or user interfacing subscriber device 125 change or adapt depending on the publications received or events reported to adaptive publish/subscribe broker 105. A context driven subscription 135 may indicate that a particular publication received by the adaptive publish/subscribe broker 105 acts as trigger, notifying adaptive publish/subscribe broker 105 to send additional publications to the subscribing device in response to having received the trigger.

For example, subscriber device 105 may be a network monitoring device configured to diagnose and repair servers whose response times drop below a particular threshold. Accordingly, a context-driven subscription 135 selected by the subscriber device 105 may indicate that publications of a system log for a server should be sent when the response time for the server drops below a predetermined threshold, but the publications of the system log should not be sent when the server's response times are within acceptable ranges. In order to accomplish this context-driven publication, adaptive publish/subscribe broker 105 would receive a subscription 135 which indicates that a publication indicating a response time for the server of interest is below a predetermined threshold should act as a trigger publication. When the trigger publication is received, adaptive publish/subscribe broker 105 would begin publishing related publications, such as the system log publications for the server, to subscriber device 105.

Other examples of trigger publication may include an over-threshold packet error rate received within a predetermined time period of a loss of frame publication, or a publication indicating that a human has logged into system 100 serving as a trigger for publications that would only be of interest to a human operator. Additionally, field notices about bug fixes and configuration workarounds may serve as triggers when received in conjunctions with certain Key Performance Indicators (KPI's) that are relevant to how a subscriber device is being used.

In addition to subscribing to a publication for a single publisher device as described above, subscriber devices can subscribe to publications for classes or groups of publisher devices. The subscriptions may can be specific to an area of interest (e.g., security, resource utilization, etc.), or be subscriptions to aggregations of several types of status reporting. Additional methods of providing context-driven and adaptive subscription/publication services will be discussed in greater detail with reference to FIGS. 3-6.

In order to receive subscriptions 135 from subscriber devices 110 and user monitored subscriber devices 125, adaptive publish/subscribe broker 105 also maintains context driven publication options 140. Context driven publication options 140 may represent events and services that would be of interest to subscriber devices 110, 125. Examples of context driven publication options 140 may include product notifications, security alerts, software/patch availability notifications, inventory changes, stateless exception events stateful changes pertaining to equipment or services, and performance and usage threshold crossings.

Context drive publication options 140 may be received by adaptive publish/subscribe broker 105 when a publisher 115 and/or an information feeds publisher 120 logs into adaptive publish/subscribe broker 105. For example, when publisher device 115 logs into adaptive publish/subscribe broker 105, it communicates its intent to publish certain event streams and/or services as options for publication. The publications are stored at adaptive publish/subscribe broker 105 as context driven publication options 140. Adaptive publish/subscribe broker 105 presents the context driven publication options 140 to the subscriber devices, such as subscriber device 110 and/or user interfacing subscriber device 125. When the adaptive publish/subscribe broker 105 is embodied in an instant messaging server which utilizes XMPP, the XMPP service discovery extension may be used to present the context driven publication options 140 to the subscriber device.

Figure 2:
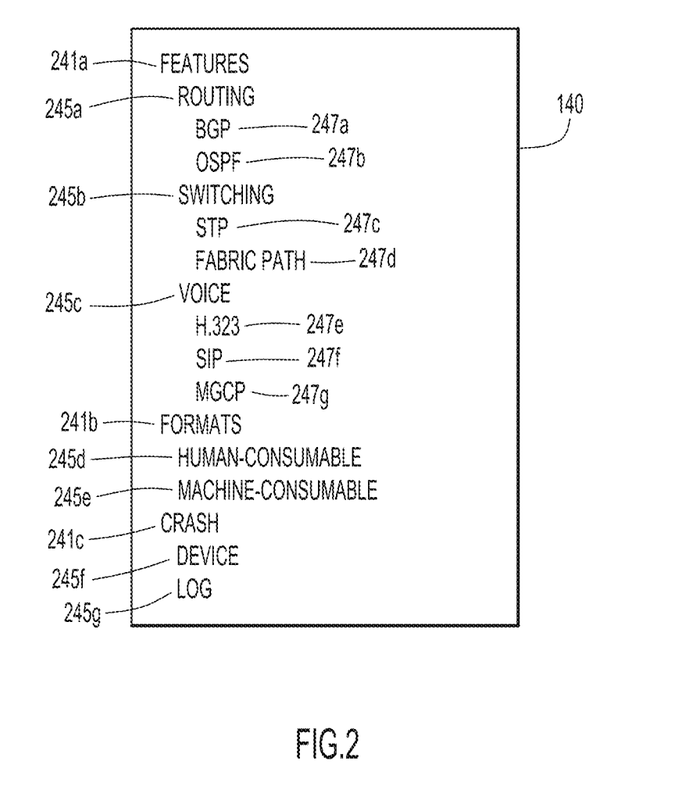
FIG. 2 is menu structure illustrating context driven publication options.

Context driven publication options 140 may be received from publisher device 120, or arranged by adaptive publish/subscribe broker 105, to have a hierarchical structure. According to one example, context driven publication options 140 may have a menu structure which is received and stored in adaptive publish/subscribe broker 105 as an extensible mark-up language ("XML") file. Turning briefly to FIG. 2, depicted therein is an example context drive publication option 140 having a menu structure. Specifically, menu entries 241a-c indicate primary menu items, menu entries 245a-g indicate secondary menu items, and menu entries 247a-g indicate tertiary menu items.

Primary menu items 241a-c may indicate event streams. Secondary menu items 245a-g may represent specific event occurrences in a within the primary menu item 241a-c event streams, or a secondary event stream within the event stream indicated by primary menu items 241a-c. Where applicable, tertiary menu items 247a-g may represent specific event occurrences in the event streams corresponding to secondary menu items 245a-g, or event streams with additional events thereunder. Additional levels of entries, such as quaternary entries, may also be included in the hierarchical structure of menu 140.

Each primary menu item 241a-c may be associated with a particular event, such that if a subscriber device selects the primary menu item, the streams and events associated with the secondary menu items will be published to the subscribed device. For example, if a subscriber device selects primary menu item 241c, a publication of a device crashing may serve as a trigger to publish the streams and events associated with secondary menu items 245f and 245g. Accordingly, until a crash event is received by the adaptive publish/subscribe broker, the streams and events associated with secondary menu items 245f and 245g may not be pushed to the subscriber device. On the other hand, as soon as a crash event is received by the adaptive publish/subscribe broker, the events and streams associated with secondary menu items 245f and 245g will be pushed to the subscriber device.

According to other examples, the subscriber device may choose to ignore the menu structure provided by context driven publication options 140, and provide the adaptive publish/subscribe broker with a subscriber determined trigger and secondary publications.

Referring back to FIG. 1, also depicted therein is authorization policy database 130, which is configured to provide adaptive publish/subscribe broker 105 with information concerning which subscriber devices 110 and/or human monitored subscriber devices 125 are authorized to receive particular publications. Accordingly, before context driven publication options 140 are presented to subscriber devices 110, 125, adaptive publish/subscribe broker 105 may refer to authorization/policy database 130 to ensure that subscriber devices 110 and 125 have the correct permissions to access system 100, and also which context driven publication options 140 the subscribed devices 110, 125 are permitted to access. Similarly, before publisher devices 115, 120 are permitted to share context driven publication options 140 with adaptive publish/subscribe broker 105, adaptive publish/subscribe broker 105 may refer to authorization/policy database 130 to ensure that publisher devices 115, 120 have permission to access system 100 and permission to share the specific context driven publication options 140 they intends to provide to adaptive publish/subscribe broker 105.

When an adaptive publish/subscribe server is implemented through XMPP, whitelists and blacklists for access to publications and subscriptions may be defined in terms of the XMPP Jabber ID (JID). However, these can also be defined differently and/or more generically, and then resolved via embedded mapping rules into JIDs for consumption by the XMPP server. The embedded mapping rules may be included in the XMPP roster along with the JID and other node data.

There are several ways in which a publisher or subscriber device can provide its attributes. The publisher or subscriber device can provide/expose its credentials after it has authenticated itself and registered with the XMPP server. To prevent forging by compromised nodes, some key attributes can be included in a signed certificate presented by the publisher or subscriber device. As with any other registration procedure, manual verification by security personnel is not precluded, nor is external verification via other means. Blacklists and whitelists may define individual publisher or subscriber device, sets of publisher or subscriber devices defined per some grouping rule, as well as subscriber-publisher pairings with individual nodes and groups in the capacity of publisher or subscriber. Examples of attributes that can be used in whitelists and blacklists include:

a. Node type—server PID, router PID, network management system, information feed source, smart phone etc.
b. Node instance: serial number, software license number, MAC id, IP address. serial number etc.
c. Human/machine role/type. Roles are fine grained partitions of the following endpoint types such as support team, backend application, partner, partner affiliate, partner Network Operation Center (NOC) application etc.
d. Publication sources allowed to source to a specific node type or human/machine role/type.
e. Event streams to which a node type or role type is allowed to subscribe e.g. security events, voice performance threshold crossing events, device condition reports etc.
f. Publish format that can be sourced by or received by a node type or role type (e.g. raw output, processed statistic, summary, headers etc.).
g. Time of day restrictions and notification preference for node types and role types (e.g. always allowed, publish to smart phone after 5 PM or on the weekends, publish to multiple destinations on holidays etc.).

These whitelists and blacklists can be supplemented with temporary or permanent blacklists of humans and devices that take effect for security reasons such a certain number of authentication failures.

Figure 3:
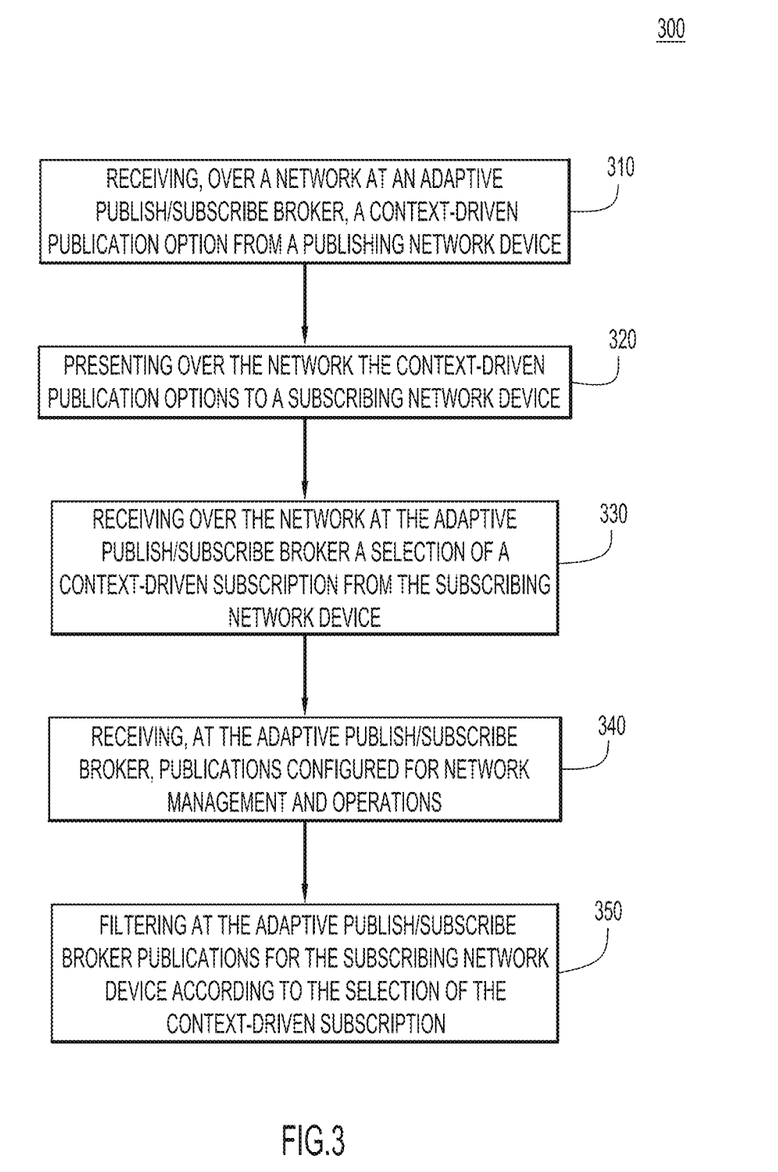
FIG. 3 is a flowchart illustrating a method of providing adaptive publish/subscribe services.

Referring now to FIG. 3, depicted therein is a flowchart 300 illustrating a process for providing adaptive publish/subscribe services. The process begins in step 310 where a context driven publication option is received at an adaptive publish/subscribe broker over a network from a publishing network device. The context-driven publication option may have hierarchical or menu structure as illustrated by context-driven publication option 140 of FIG. 2. Furthermore, the context-driven publication option may be received as an XML file sent according to the XMPP protocol.

In step 320, the context-driven publication option is presented over the network to a subscriber network device. Presenting the context-driven publication option may comprise sending an XML file to the subscriber network device according to the XMPP protocol.

In step 330, a selection of a content-driven subscription is received over the network at the adaptive publish/subscribe broker from the subscribing network device. Receiving the content-driven subscription may include receiving an indication of a trigger publication which acts as a contextual trigger publication. According to other examples, if the context-driven publication option is presented in the form of a menu, receiving the content driven subscription may also include receiving an indication of a publication corresponding to a menu item that serves as a trigger to publish publications corresponding to submenu items under the menu item.

In step 340, publications are received at the adaptive publish/subscribe broker, the publications being configured for network management and operations. These publications may be received as messages sent according to the XMPP protocol. The publications may include messages for new product notifications, security alerts, software patch notifications, software update notifications, network performance information, device state changes, device service changes, or network configuration changes, as well as others.

Finally, in step 350, publications are filtered at the adaptive publish/subscribe broker according to the selection of the content driven subscription. The filtering may involve not sending publications which are received at the adaptive publish/subscribe broker prior to receiving the trigger publication. On the other hand, after the trigger publication is received, filtering the publications may involve sending (i.e. publishing) the publications indicated by the selection of the content-driven subscription. If a the selection of the content-driven subscription included receiving a first menu item indicating a trigger publication is received, filtering the received publications may include sending or not sending publications corresponding to sub-menu items depending on whether or not the publication corresponding to the menu item has been received. If the menu item has been received, the publications corresponding to the sub-menu items may be sent to the subscribing device, but if the publication corresponding to the menu item has not been received, the publication corresponding to the sub-menu items may not be sent to the subscribing device.

Figure 4:
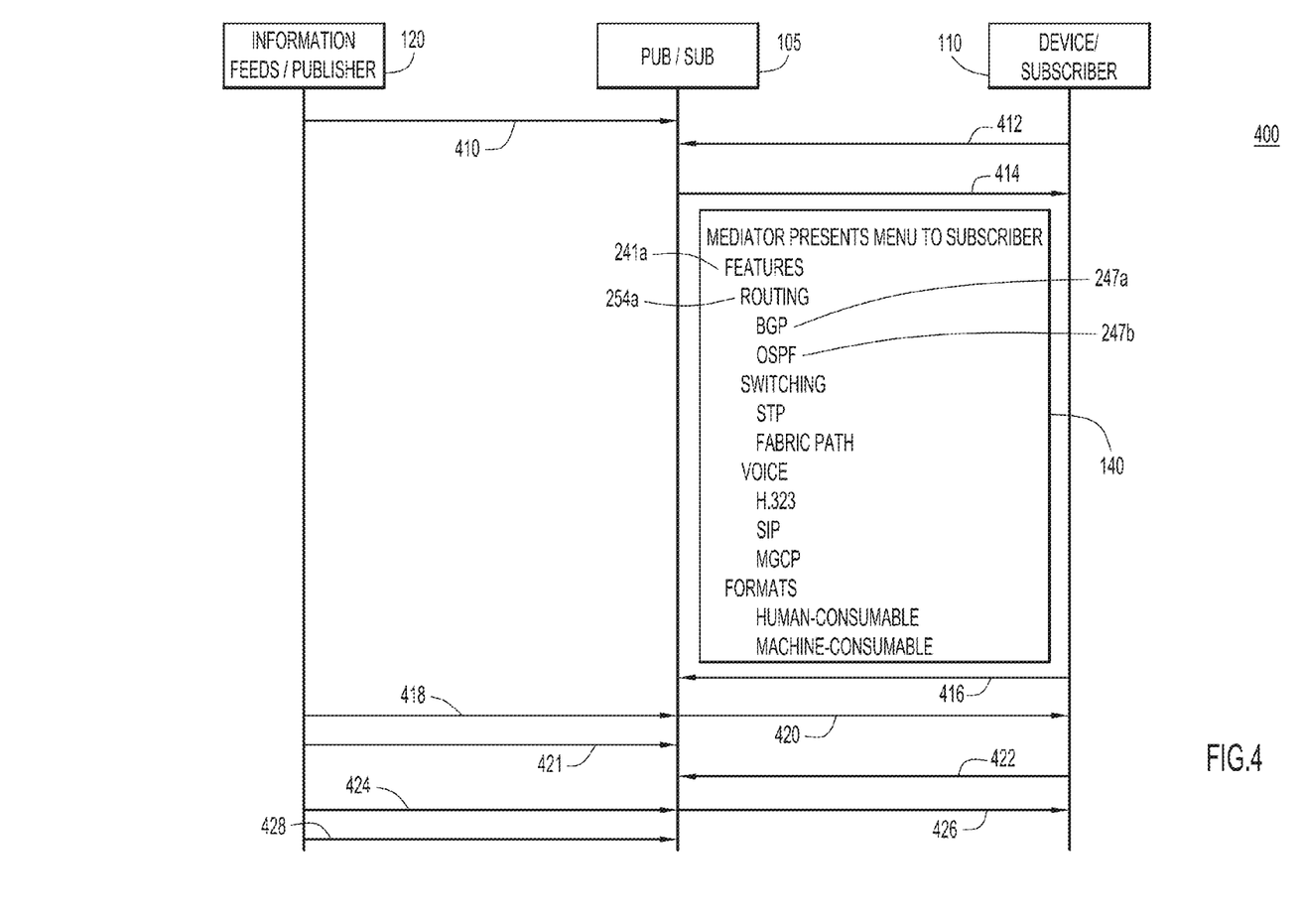
FIG. 4 is a ladder diagram illustrating adaptive publish/subscribe services for security alerts.

Turning now to FIG. 4, depicted therein is a ladder diagram 400 illustrating a specific example of the general process described in connection with the flowchart 300 of FIG. 3. Specifically, the ladder diagram of FIG. 4 illustrates the messages sent between a publisher device 120, in this case, a security advisory publisher, an adaptive publish/subscribe broker 105, and a subscriber device 110, in this case a router device initially configured to perform open shortest path first {"OSPF") routing. In step 410, the publisher device 120 advertises to adaptive publish/subscribe broker 105 its intention to publish security advisories in a structured manner, in this case, a hierarchical menu structure. Message 410 may include a context-driven publication option, or, adaptive publish/subscribe broker 105 may generate a context-driven publication option based on its knowledge of publisher device 120. For example, adaptive publish/subscribe broker 105 may know which publication options are available from publisher device 120 based on the content of a database, such as authorization and policy database 130 of FIG. 1.

Subsequently, subscriber device 110 indicates its desire to subscribe to security advisories to adaptive publish/subscribe broker 105 through message 412. In response, adaptive publish/subscribe broker 105 sends context-driven publication option 140 to subscriber device 110 through message 414. If, on the other hand, adaptive publish/subscribe broker 105 had not previously received context-driven publication option 140 from publisher device 120, adaptive publish/subscribe broker 105 could instead send an indication to subscriber device 110 that no security advisory publications are available. Subscriber device 110 subscribes to adaptive publish/subscribe broker 105 by sending message 416 which includes a context-driven subscription. According to the present example, subscriber device 110 indicates that the tertiary menu item 247b shall serve as its trigger menu item because subscriber device 110 is configured for OSPF routing. According to other examples, subscriber device 110 will send an indication of a trigger publication which is different from the predefined menu items in context-driven publication option 140.

At some point after subscriber device 110 sends message 416, publisher 120 sends publication 418 to adaptive publish/subscribe broker 105 which is a security advisory affecting OSPF database corruption, and therefore, is an event under tertiary menu item 247b of context-driven publication option 140. Accordingly, when adaptive publish/subscribe broker 105 receives publication 418, it publishes the security advisory to subscriber device 110 through publication 420.

The next publication 421 received from publisher device 120 is an advisory affecting routers configured for boarder gateway protocol ("BGP") routing. Therefore, the publication falls under tertiary menu item 247a of context-driven publication option 140. Because subscriber device 110 has only indicated OSPF tertiary menu item 247b as its trigger, adaptive publish/subscribe broker 105 filters the publication by dropping the publication as there is no subscriber interest in this publication.

Subsequent to the dropping of publication 421, subscriber device 110 is reconfigured to provide BGP routing. In response to this reconfiguration, subscriber device sends message 422, thereby dynamically changing its context-based subscription selection from tertiary menu item 247b to the BGP menu item, tertiary menu item 247a. Accordingly, when publication 424, which is another advisory affecting BGP routing, it received by adaptive publish/subscribe broker 105 it is not dropped. Instead, publication 424 is published to subscriber device 110 through publication 426.

The next publication 428 received from publisher device 120 is a second advisory affecting routers configured for OSPF routing. Now, because subscriber device 110 has dynamically changed its subscription from tertiary menu item 247b to tertiary menu item 247a, adaptive publish/subscribe broker 105 filters publication 428 by dropping the publication as there is no longer subscriber interest in this publication.

Figure 5:
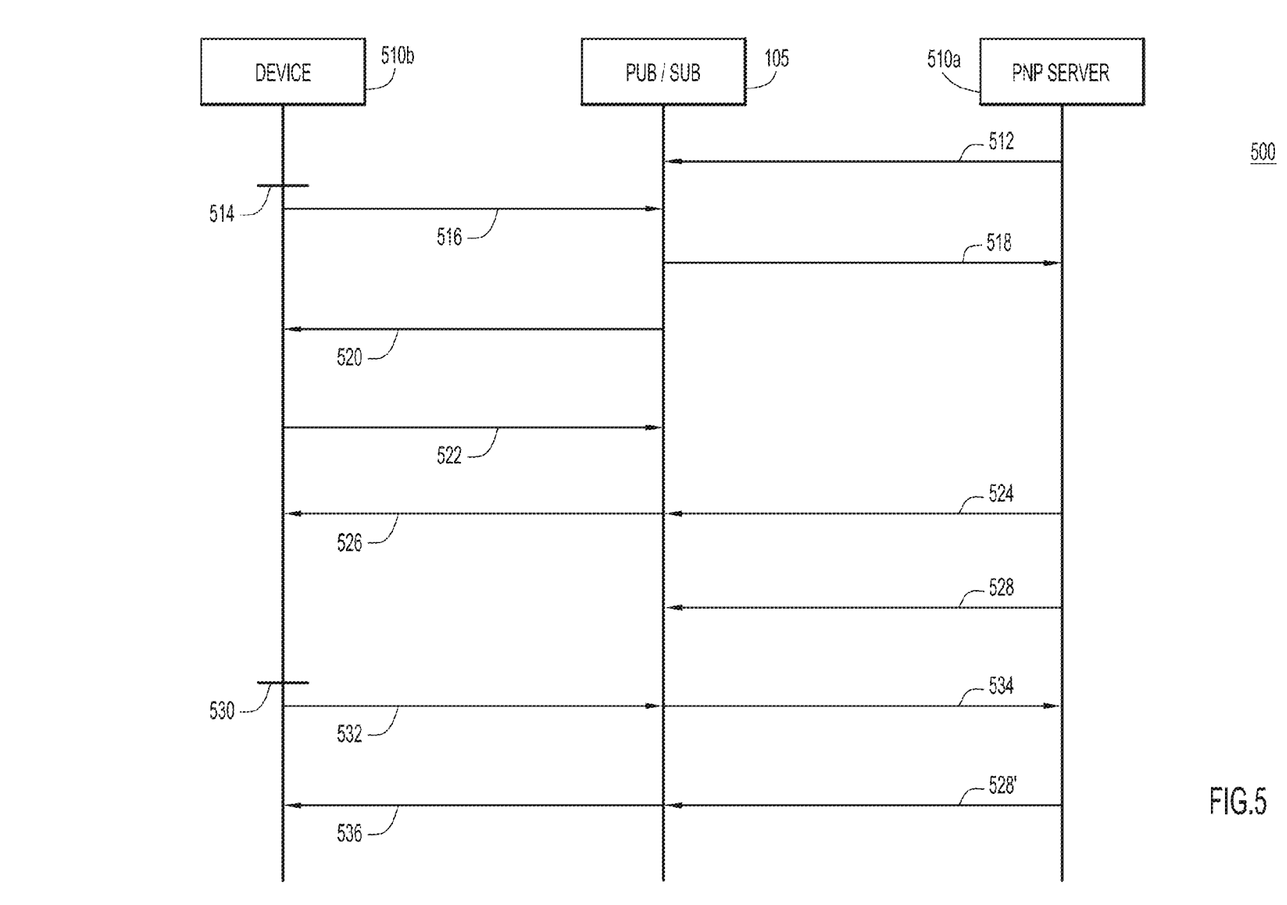
FIG. 5 is a ladder diagram illustrating adaptive publish/subscribe services for a plug and play device configuration.

Turning now to FIG. 5, depicted therein is a ladder diagram 500 illustrating another example of adaptive publish/subscribe services, but here the services are used to provide device discovery, device configuration and software updates to the subscriber device. Of particular note in this example is that some of the devices described with reference to FIG. 5 serve as both publishing and subscribing devices.

The services of FIG. 5 begin when device 510a, which acts as a plug-and-play ("PNP") server, logs into adaptive publish/subscribe broker 105 with message 512. Message 512 includes a subscription to adaptive publish/subscribe broker 105 which uses a "new devices and/or features" publication event as its trigger, and also furnishes context-driven publication options for software updates.

At time 514, device 510b initializes or "boots up." Message 516 is sent to log into adaptive publish/subscribe broker 105. Upon receiving message 516, adaptive publish/subscribe broker 105 publishes the login of device 510b to PNP server 510a through message 518. Adaptive publish/subscribe broker 105 also furnishes device 510b with context-driven publication options, including the options provided by PNP server 510a in message 520. Device 510b subscribes to software updates for its installed hardware and features through message 522.

Through message 524, PNP server 510a provides software update publication 524 for one of the features installed on device 510b. Because device 510b has subscribed to software updates for its installed features, adaptive publish/subscribe broker 105 publishes the software update to device 510b through message 526. Subsequently, PNP server 510a publishes a software update for a hardware card not yet installed on device 510b. Because the device 510b has only subscribed to software updates for its installed features and hardware, adaptive publish/subscribe broker 105 drops the publication 528 without publishing it to device 510b.

At time 530, the hardware card to which the software card of publication 528 was directed is installed on device 510b, and device 510b sends message 532 to adaptive publish/subscribe broker 105. Message 532 serves two purposes. First, it acts as a publication that the new hardware card has been installed. Second, it serves to subscribe device 510b for software updates for the newly installed hardware card.

Because PNP server has subscribed to "new devices and/or features" publication events, adaptive publish/subscribe broker 105 publishes installation of the new hardware card to PNP server 510 through message 534. In response to receiving the publication that the new hardware card has been installed on device 510b, PNP server 510a may now republish message 528 through message 528'. And now that device 510b has subscribed to software updates for the newly added card with message 532, adaptive publish/subscribe broker 105 publishes message 528' to device 510b through message 536. As shown through this example, the techniques described herein facilitate zero touch discovery and update of network devices.

Figure 6:
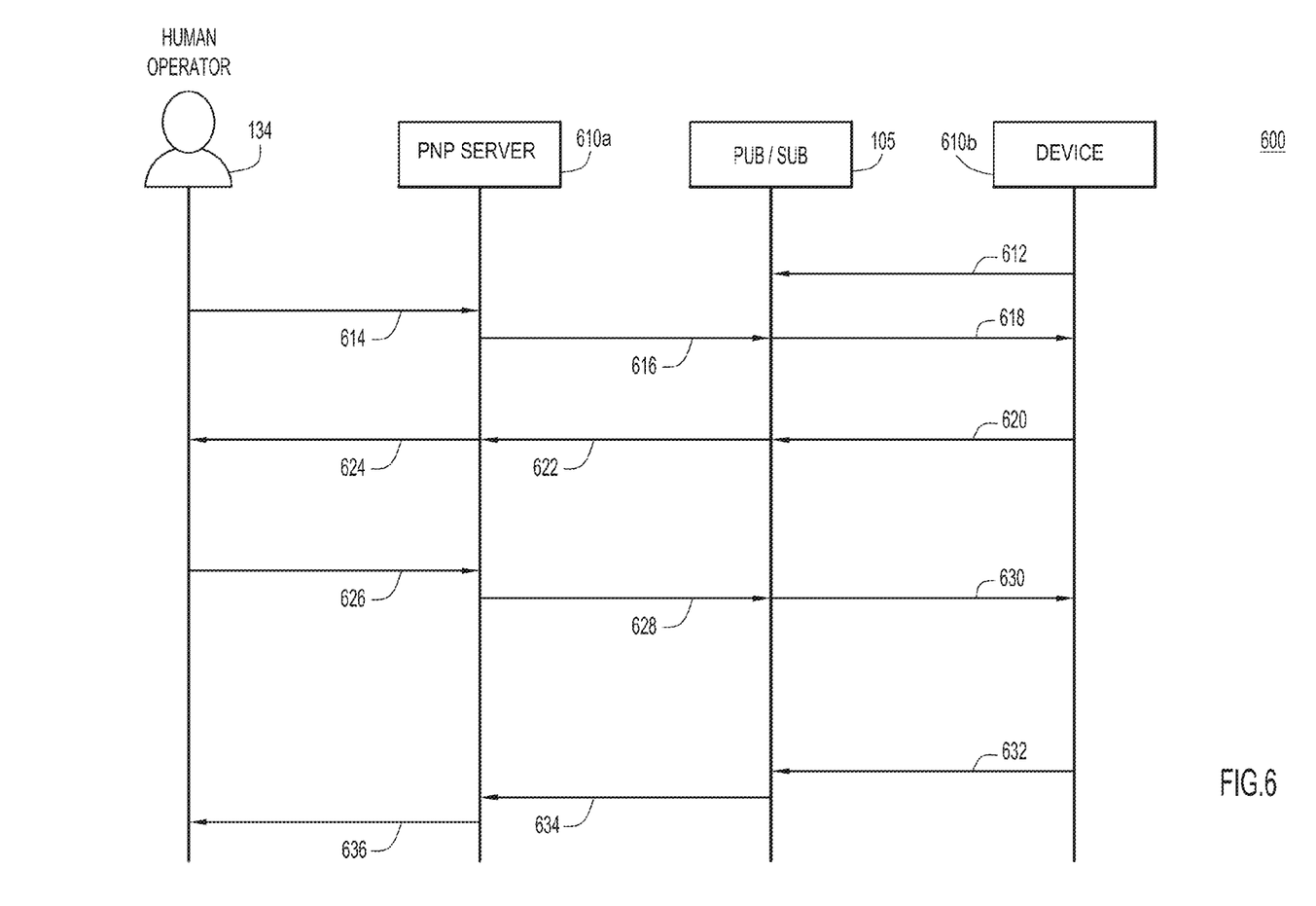
FIG. 6 is a ladder diagram illustrating adaptive publish/subscribe services in response to user determined selections.

With reference now made to FIG. 6, depicted therein is a ladder diagram illustrating an example of live viewing of different event and/or log streams as part of a human directed analysis and troubleshooting workflow. Specifically, human operator 134 is operating the input/output and display devices of PNP server 610a in order to monitor and trouble shoot device 610b. Ladder diagram 600 begins when device 610b sends message 612 to adaptive publish/subscribe broker 105. Message 612 serves to subscribe device 610b to "human request" publications, and also to furnish context-driven publication options for the publications provided by device 610b. According to the present example, message 612 includes diagnostic context-driven publication options.

Human operator 134, in order to monitor device 610b requests information through the input/output devices of PNP server 610a with user input 614. In response to the content of user input 614, PNP server 610a subscribes to the diagnostic context-driven publication options previously provided to adaptive publish/subscribe broker 105 with message 616. Because message 616 comprises a "human request" publication, it is published to device 610b by adaptive publish/subscribe broker 105 through message 618.

In response to message 618, device 610b publishes all "human requested" publications indicated in message 618. Because device 610b serves as both a subscriber, to "human requests," and a publisher of "human requests," it can hold off on publishing the "human requests" until it receives a publication like message 618 requesting them.

Device 610b responds to message 618 by publishing all of the requested "human request" publications through message 620 to adaptive publish/subscribe broker 105 through message 620. Because device 610a is subscribed to diagnostic content from device 610b, publication 620 is published to device PNP server 610a through publication 622. PNP server 610a then displays publication 622 to the user through display 624.

The system illustrated in FIG. 6 further allows human operator 134 to dynamically alter the diagnostic information it is receiving from device 610*b*. For example, human operator 134 may wish to view different or additional diagnostic information, and may indicate this desire through user input 626. In response to the content of user input 626, PNP server 610*a* subscribes to the additional or changed diagnostic context with message 628. Because message 628 comprises a "human request" publication, it is published to device 610*b* by adaptive publish/subscribe broker 105 through message 630. Device 610*b* responds to message 630 by publishing all of the requested "human request" publications through message 632 to adaptive publish/subscribe broker 105. Because device 610*a* is subscribed to diagnostic content from device 610*b*, publication 632 is published to PNP server 610*a* through publication 634. PNP server 610*a* then displays publication 634 to the user through display 636, thereby dynamically altering the diagnostic information view by human operator 134.

Accordingly, the techniques herein may also be utilized to augment PNP architecture. As described above, the adaptive publish/subscribe broker 105 can be used to inform interested parties (such as the PnP server itself) about new, devices joining the network. For example, when a new device joins an existing network, the existing PnP agent device sees the topology change (either directly or through topology discovery). It then publishes a topic on the pub-sub bus that a new device has joined its network. The PnP server can then interact with that device through the agent gateway (or directly with the new device if possible). In this manner, legacy devices could be supported in the PnP framework.

In addition to the examples described above in reference to FIGS. 4-6, additional uses of the techniques described herein may include the following.

The techniques herein may be utilized to distribute machine-readable, auto-actionable RSS feeds to network/device managers or end devices for addressing security advisories, field notices, end of sale/support statements, software updates and known bugs. Like human-readable RSS feeds, machine-readable feeds can be sent and received in an XML format. The RSS feeds may contain configuration scripts, or pointers to patches and configuration scripts for fixing or working around issues and bugs. An outside distributor may subscribe to the RSS feeds using normal hypertext transfer protocol ("http") mechanisms and receive feed contents via XMPP message from an adaptive publish/subscribe broker. Relaying RSS feeds via an adaptive publish/subscribe broker (rather than http techniques) allows feed contents to be pushed in a timely, secure manner behind firewalls as soon as the content becomes available. Because an adaptive publish/subscribe broker allows managers and devices to subscribe to specific sub-feeds only when certain KPIs are not met, subscribers are given the option of minimizing or otherwise controlling the application of device fixes.

Operations such as software image upgrades can be made more efficient by configuring the adaptive publish/subscribe broker to cache entire software images, instead of doing multiple transfers over the WAN.

The techniques described herein allow devices and managers to parse configurations using rules and best practices. For example, an adaptive XMPP publication/subscription broker can be used to subscribe to the publication of different classes of rules/best practices (e.g. BGP configuration best practices) as these are devised by experts. A manager or end user device subscribes to a class of rules only if the feature addressed by that class is enabled. In order to enhance efficiency, the pattern of subscriptions is modified to address current functionality as features are enabled or disabled. As explained above, the use of adaptive XMPP publish/subscribed services rather than other protocols allows the secure and timely push from intellectual capital (IC) sources outside a corporate firewall. As in other use cases, the push might consist of pointers to content rather than actual content if the intent is to restrict the size and volume of XMPP transfers. In this case, the actual content is downloaded via another protocol such as HTTP or HTTPS.

The techniques described herein also allow an XMPP server to post to its own adaptive publish/subscribe broker its intent to publish the presence of new managed devices. Upon logging into the XMPP server, a performance manager and a security manager scan the context driven publication options and subscribe to this service. Subsequently, a newly installed managed device logs into the XMPP server and posts (to the XMPP server's adaptive publish/subscribe broker) its intent to publish periodic primary and standby route processor utilization measurements as well as denial of service ("DoS") attacks as events, along with supporting details. Per prior subscription, the performance manager and security manager are notified of the appearance and the context driven publication options of this managed device. The performance manager subscribes to the notification of primary and standby route processor utilization measurements. The security manager subscribes to the notification of suspected DoS attacks. This "hook-up" or "rendezvous" is accomplished with "zero touch," and subsequent events and measurements breaches are automatically pushed to the appropriate manager. According to other examples, there may be a third manager that subscribes to both classes of events for the purpose of data trending, archiving and mining. Furthermore, alarms and/or traps indicating enduring malfunctions and service-affecting outages may also be published through an adaptive publish/subscribe broker.

The techniques described herein may also allow managed devices to join a community of interest based on their configuration or on XMPP service discovery. One or more community representatives may be configured or elected to serve as an XMPP adaptive publish/subscribe broker. Alternately, the adaptive publish/subscribe broker may be hosted by an XMPP server. Managed devices publish events and services to an adaptive publish/subscribe broker which pushes these events and services to peer subscribers in the community of interest. Aside from the enhanced management aspects, inter-device publish/subscribe allows for advanced service discovery (e.g., availability/status of transcoding capabilities on Session Border Controllers, availability/loading of cryptographic capabilities on specialized hardware etc.). Further, these techniques create an efficient, distributed and relevance-enhancing communication mechanism that can be used to mount a coordinated mitigation response to harmful network events such as DoS attacks. Each device can have its own "bulletin board," or all devices can publish and subscribe to a common "bulletin board." This set of bulletin boards or a single, common bulletin board constitute a community of interest.

Furthermore, the techniques described herein are generic and can encompass mechanisms other than RSS feeds (such as emails) for relaying auto-actionable issues and their solutions to distributor nodes.

Figure 7:
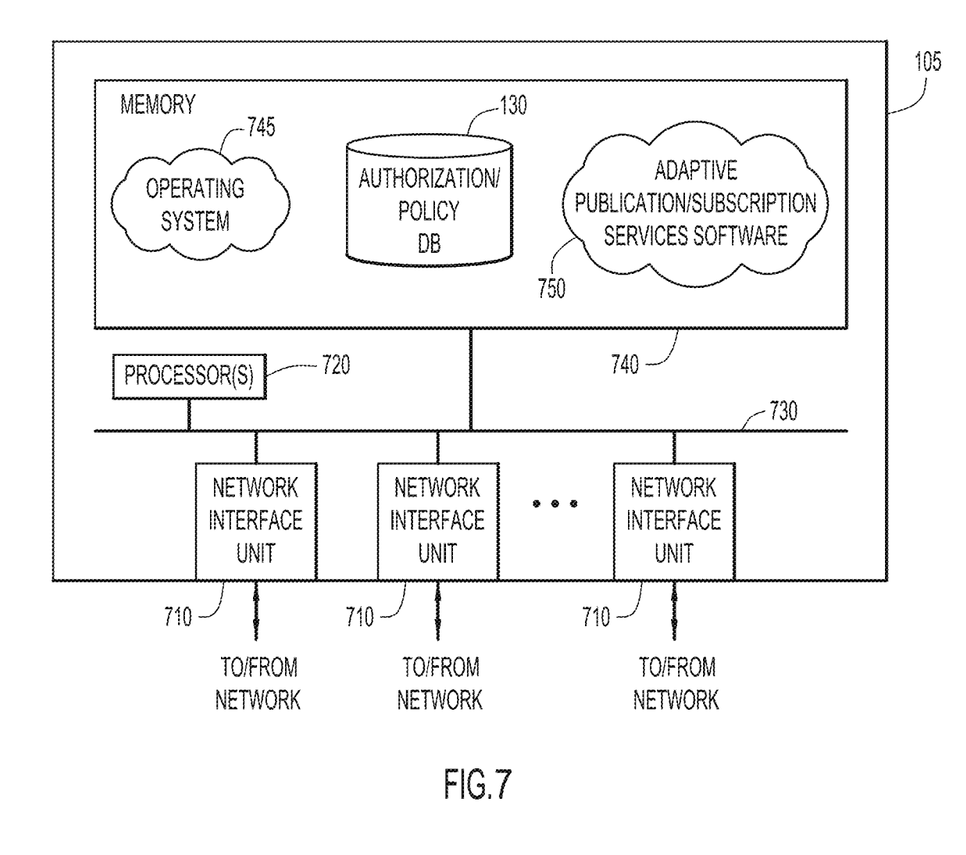
FIG. 7 illustrates a device configured to perform adaptive publish/subscribe services.

Turning now to FIG. 7, depicted therein is an example block diagram of a network device, e.g., an adaptive publish/subscribe broker 105, configured to perform the techniques described herein in connection with FIGS. 1-6. The adaptive publish/subscribe broker 105 comprises one or more network interface units 710 (e.g., network interface cards) to enable communication over a network, processor(s) 720, bus 730, and memory 740. The memory 740 contains software instructions for operating system 745 and adaptive publish/subscribe services software 750.

Memory 740 may comprise read only memory (ROM), random access memory (RAM), magnetic disk storage media devices, optical storage media devices, flash memory devices, electrical, optical, or other physical/tangible (e.g., non-transitory) memory storage devices. The processor 720 is, for example, a microprocessor or microcontroller that executes instructions for the proxy device logic. Thus, in general, the memory 740 may comprise one or more tangible (non-transitory) computer readable storage media (e.g., a memory device) encoded with software comprising computer executable instructions and when the software is executed (by the processor 720), and in particular adaptive publish/subscribe services software 750, it is operable to perform the operations described herein in connection with FIGS. 1-6. Memory 740 may also story authorization/policy database 130.

The above description is intended by way of example only.

What is claimed is:

1. A method comprising:
receiving, over a network at an adaptive publish/subscribe broker, a context-driven publication option from a publishing network device;
presenting over the network the context-driven publication option to a subscribing network device;
receiving over the network at the adaptive publish/subscribe broker a selection of a context-driven subscription from the subscribing network device, wherein the context-driven subscription comprises a plurality of publications, wherein at least one of the plurality of publications is a contextual publication to trigger publishing of related publications to the contextual publication to the subscribing network device such that the related publications are not published to the subscribing network device if received prior to the contextual publication and the related publications are published to the subscribing network device if received after the contextual publication;
receiving a first related publication of the plurality of publications at the adaptive publish/subscribe broker prior to receiving the contextual publication;
filtering the first related publication without publishing the first related publication to the subscribing network device and waiting for the contextual publication to be received by the publish/subscribe broker;
receiving, at the adaptive publish/subscribe broker, the contextual publication of the plurality of publications configured for network management and operations;
receiving a second related publication of the plurality of publications at the adaptive publish/subscribe broker after receiving the contextual publication, wherein the second related publication is a different publication than the contextual publication; and
filtering the second related publication by publishing the second related publication to the subscribing network device in response to having previously received the contextual publication, wherein the second related publication would not have been published to the subscribing network device if the second related publication had been received at the adaptive publish/subscribe broker prior to the contextual publication.

2. The method of claim 1, wherein presenting the context-driven publication option comprises presenting a plurality of menu items and sub-menu items under at least one of the menu items; and
wherein receiving the selection of the context-driven subscription comprises receiving an indication to publish the second related publication corresponding to a sub-menu item under a menu item after receipt of the contextual publication corresponding to the menu item.

3. The method of claim 2, wherein filtering the second related publication for the subscribing network device further comprises publishing, in response to receiving the publication corresponding to the menu item, the second related publication corresponding to the sub-menu item under the menu item.

4. The method of claim 2, wherein receiving the first related publication comprises receiving a publication corresponding to sub-menu items under a menu item corresponding to the contextual publication from the publishing network device; and
wherein filtering the publication comprises not publishing, in response to not having received the publication corresponding to the menu item, the first related publication corresponding to the sub-menu items under the menu item to the subscribing network device.

5. The method of claim 1, wherein receiving the contextual publication comprises receiving the contextual publication from the publishing network device.

6. The method of claim 1, wherein receiving the contextual publication comprises receiving the contextual publication from the subscribing network device.

7. The method of claim 1, wherein receiving the contextual publication comprises receiving an indication that the subscribing network device has been newly added to a network connecting the subscribing network device and the publishing network device; and
wherein receiving related publications comprises receiving publications operable to configure the subscribing network device.

8. The method of claim 1, wherein receiving the first related publication, the second related publication, and the contextual publication comprises receiving publications according to an instant messaging protocol.

9. The method of claim 8, wherein receiving publications according to the instant messaging protocol comprises receiving publications according to the Extensible Messaging and Presence Protocol (XMPP), and
wherein the adaptive publish/subscribe broker comprises an XMPP server.

10. The method of claim 1, wherein presenting context-driven options comprises sending a hierarchically structured message to the subscribing network device.

11. The method of claim 1, wherein receiving at least one of the first related publication, the second related publication or the contextual publication comprises receiving at least one of a product notification, security alert, software patch notification, software update notification, network performance information, device state change, device service change, or network configuration change.

12. An apparatus comprising:
a memory;
a network interface unit configured to enable communications over a network; and
a processor coupled to the memory and the network interface unit, and configured to:

receive, via the network interface unit, a context-driven publication option from a publishing network device;

present, via the network interface unit, the context-driven publication option to a subscribing network device;

receive, via the network interface unit, a selection of a context-driven subscription from the subscribing network device, wherein the context-driven subscription comprises a plurality of publications, wherein at least one of the plurality of publications is a contextual publication to trigger publishing of related publications to the contextual publication to the subscribing network device such that the related publications are not published to the subscribing network device if received prior to the contextual publication and the related publications are published to the subscribing network device if received after the contextual publication;

receive, via the network interface unit, a first related publication of the plurality of publications prior to receiving the contextual publication;

filter the first related publication without publishing the first related publication to the subscribing network device and waiting for the contextual publication to be received by the apparatus;

receive, via the network interface unit, the contextual publication of the plurality of publications configured for network management and operations;

receive, via the network interface unit, a second related publication of the plurality of publications after receiving the contextual publication, wherein the second related publication is a different publication than the contextual publication; and filter the second related publication by publishing the second related publication to the subscribing network device in response to having previously received the contextual publication, wherein the second related publication would not have been published to the subscribing network device if the second related publication had been received at the apparatus prior to the contextual publication.

13. The apparatus of claim 12, wherein the processor is further configured to:

present a plurality of menu items and sub-menu items under at least one of the menu items; and receive an indication to publish the second related publication corresponding to a sub-menu item under a menu item after receipt of the contextual publication corresponding to the menu item.

14. The apparatus of claim 13, wherein the processor is further configured to publish, in response to receiving the contextual publication corresponding to the menu item, the second related publication corresponding to the sub-menu item under the menu item.

15. A tangible, non-transitory computer readable storage medium encoded with instructions, that when executed by a processor, cause the processor to:

receive a context-driven publication option from a publishing network device;

present the context-driven publication option to a subscribing network device;

receive a selection of a context-driven subscription from the subscribing network device, wherein the context-driven subscription comprises a plurality of publications, wherein at least one of the plurality of publications is a contextual publication to trigger publishing of related publications to the contextual publication to the subscribing network device such that the related publications are not published to the subscribing network device if received prior to the contextual publication and the related publications are published to the subscribing network device if received after the contextual publication;

receive a first related publication of the plurality of publications prior to receiving the contextual publication;

filter the first related publication without publishing the first related publication to the subscribing network device and waiting for the contextual publication to be received by the processor;

receive the contextual publication of the plurality of publications configured for network management and operations;

receive a second related publication of the plurality of publications after receiving the contextual publication, wherein the second related publication is a different publication than the contextual publication; and filter the second related publication by publishing the second related publication to the subscribing network device in response to having previously received the contextual publication, wherein the second related publication would not have been published to the subscribing network device if the second related publication had been received at the processor prior to the contextual publication.

16. The computer readable storage medium of claim 15, wherein the instructions further cause the processor to:

present a plurality of menu items and sub-menu items under at least one of the menu items; and receive an indication to publish the second related publication corresponding to a sub-menu item under a menu item after receipt of the contextual publication corresponding to the menu item.

17. The computer readable storage medium of claim 16, wherein the instructions further cause the processor to publish, in response to receiving the contextual publication corresponding to the menu item, the second related publication corresponding to the sub-menu item under the menu item.

18. The apparatus of claim 12, wherein the processor is further configured to receive the contextual publication from the publishing network device.

19. The apparatus of claim 12, wherein the processor is configured to receive at least one of the first related publication, the second related publication or the contextual publication as a publication according to an instant messaging protocol.

20. The computer readable storage medium of claim 15, wherein the instructions further cause the processor to receive at least one of the first related publication, the second related publication or the contextual publication as a publication according to an instant messaging protocol.

* * * * *